United States Patent

Mott

[11] Patent Number: 5,887,702
[45] Date of Patent: Mar. 30, 1999

[54] TRAILING ARM SECONDARY BELT CLEANER

[75] Inventor: George T. Mott, Allentown, Pa.

[73] Assignee: Asgco Manufacturing, Inc., Allentown, Pa.

[21] Appl. No.: 738,221

[22] Filed: Oct. 25, 1996

Related U.S. Application Data

[60] Provisional application No. 60/005,590, Oct. 27, 1995.

[51] Int. Cl.⁶ .................................................. B65G 45/00
[52] U.S. Cl. ........................................................... 198/499
[58] Field of Search ..................................... 198/497, 499

[56] References Cited

U.S. PATENT DOCUMENTS

| | | | |
|---|---|---|---|
| 4,365,706 | 12/1982 | Bright | 198/499 |
| 4,696,389 | 9/1987 | Schwarze | 198/499 |
| 4,787,500 | 11/1988 | Holz | 198/497 |
| 4,917,231 | 4/1990 | Swinderman | 198/499 |
| 4,962,845 | 10/1990 | Gibbs | 198/499 |

FOREIGN PATENT DOCUMENTS

| | | | |
|---|---|---|---|
| 598809 | 3/1978 | U.S.S.R. | 198/499 |
| 1234315 | 5/1986 | U.S.S.R. | 198/499 |
| 2221440 | 2/1990 | United Kingdom | 198/497 |

*Primary Examiner*—Joseph E. Valenza
*Attorney, Agent, or Firm*—Dann, Dorfman, Herrell and Skillman; Henry H. Skillman

[57] ABSTRACT

A conveyor belt cleaning arrangement is provided in which belt cleaner blade(s) are positioned relative to a conveyor belt, which arrangement includes a mounting bracket, a transverse pivot support tube, a blade mounting tube with a rising male projection to engage a complementary female slot in the bottom of the blade, a blade with a female slot in the bottom to receive the male projection on the blade support tube, connecting arms and a pressure roller mounted on the opposite side of the belt to flatten and hold the belt in position, all of which act to clean material adhering to a moving conveyor belt when the cleaner blade is forced into transverse engagement with the belt.

12 Claims, 4 Drawing Sheets

TRAILING ARM SECONDARY BELT CLEANER

This application claims benefit of provisional application Ser. No. 60/005,950 filed Oct. 27, 1995.

BACKGROUND OF THE INVENTION

It has been shown in prior art to provide pivotally actuated mounting arrangements to force various types of belt cleaner blades into engagement with a moving conveyor belt. All of the conveyor belt cleaning blades of the prior art teach a flat blade being rotated from a pivot point into engagement with the belt, as the blade wears the angle that the blade(s) contacts the conveyor belt will change and therefore, the performance of the cleaning action will change. Additionally, the belt cleaner blade(s) tend to have erratic cleaning effect due to belt cupping (The tendency of the edges of the conveyor belt to turn downward along the longitudinal axis of the conveyor). On cleaning units with multiple blades having multiple support arms there is a tendency for material to build-up on the arms causing decreasing effectiveness of the belt cleaner.

In the present invention an arc is provided in the blade and the pivotal mounting arrangement is positioned at the center of the blade arc, as the blade is rotated into engagement with the conveyor belt the angle between the tangent to the blade arc and the conveyor belt will remain constant as the cleaner blade wears.

By providing a second arc with the same center point to form the back side of the blade the area of the blade in contact with the belt will be the same throughout the life of the belt cleaner blade.

The constant angle of attack and the constant cross-sectional area are important in maintaining consistency in cleaning.

A pressure roller is provided to flatten the belt in the area where the belt cleaner blade is located.

SUMMARY OF THE INVENTION

One object of the present invention is to provide a conveyor belt cleaning arrangement which is mounted on the return side of a conveyor belt and will maintain a constant angle of attack and a constant cross-sectional area of contact with the moving conveyor belt throughout the useful life of the belt cleaning blade. A rigidly supported roller mounted transverse to the direction of the conveyor system and on the opposite side of the belt holds the belt in proper position for the belt cleaner blade to contact the belt surface. Two connecting arms one on each end of the blade mounting tube support the belt cleaner blade while remaining clear of the area below the belt where build-up from the belt would occur.

DESCRIPTION OF THE PREFERRED EMBODIMENT

Figure 1:
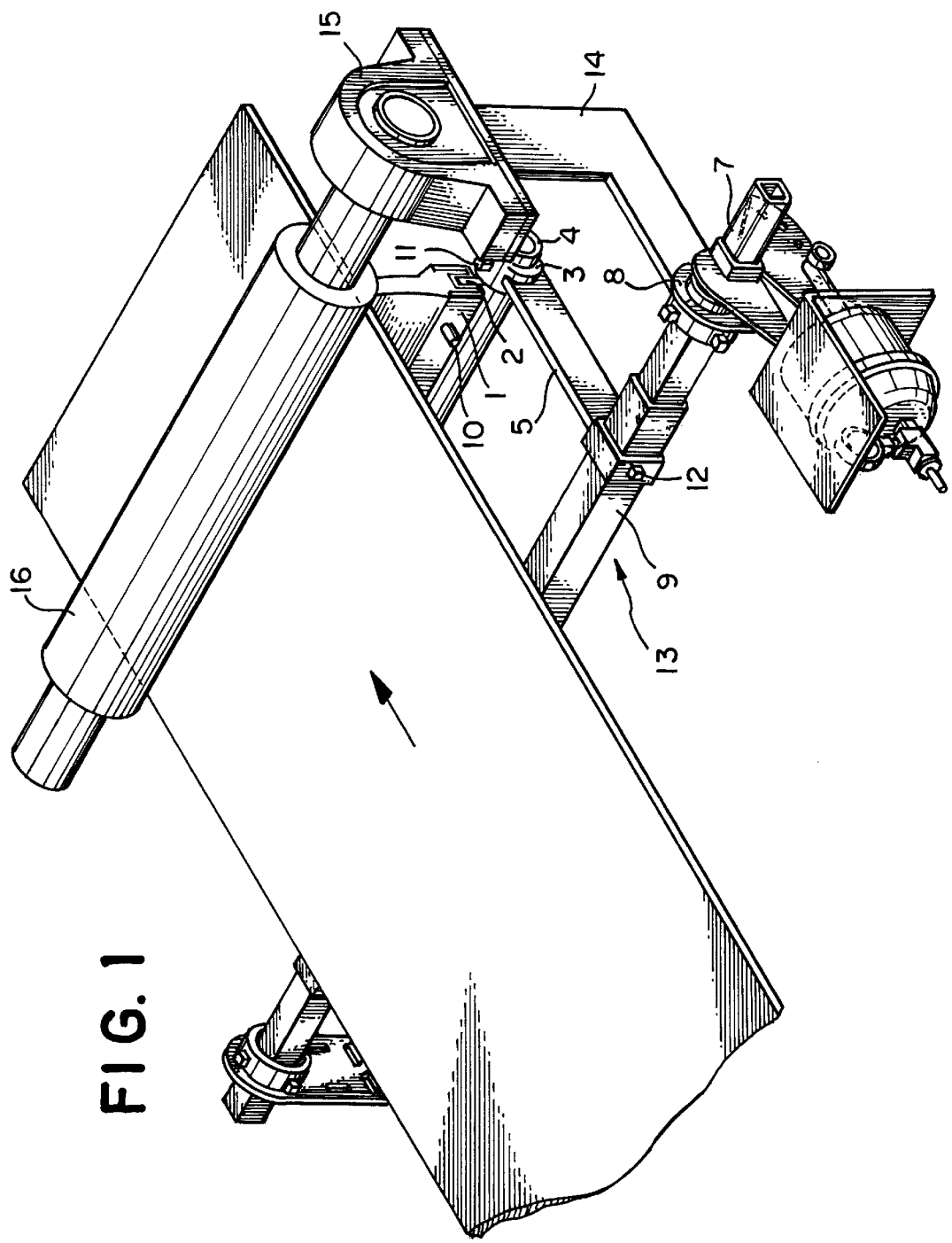
FIG. 1 is a simplified perspective view of a conveyor belt cleaner with a pressure roller constructed in accordance with a preferred embodiment of the present invention showing relationship to the conveyor.

FIG. 1 illustrates a simplified perspective of a mechanical conveyor belt cleaner designated by the numeral 13 and includes a pivot cross-shaft 9 with a telescoping extension 7 on each end of the cross-shaft. The telescoping ends 7 extend into the square cross-shaft 9 and through a round hole in mounting bracket 8 which would normally be mounted to some portion of the conveyor structure. Two blade pivot arms 5 are slidably attached to the pivot cross-shaft and lockably secured with pivot arm pivot shaft collar set screw 12. The other end of the two blade pivot arms 5 are attached to the conveyor cleaner blade cross shaft 4 through pivot arm collar 3 and secured with pivot arm collar set screw lock 11. Attached to the top of the conveyor cleaner blade cross shaft 4 is a rigid guide 2 which engages a mating slot in belt cleaner blade 1. Two pins 10 lock the belt cleaner blade 1 to the rigid guide 2. Pressure roller bracket 14 is rigidly attached to conveyor frame at mounting bracket 8. Mounted to the roller bracket is a bearing 15 which carries the pressure roller 16.

Figure 2:
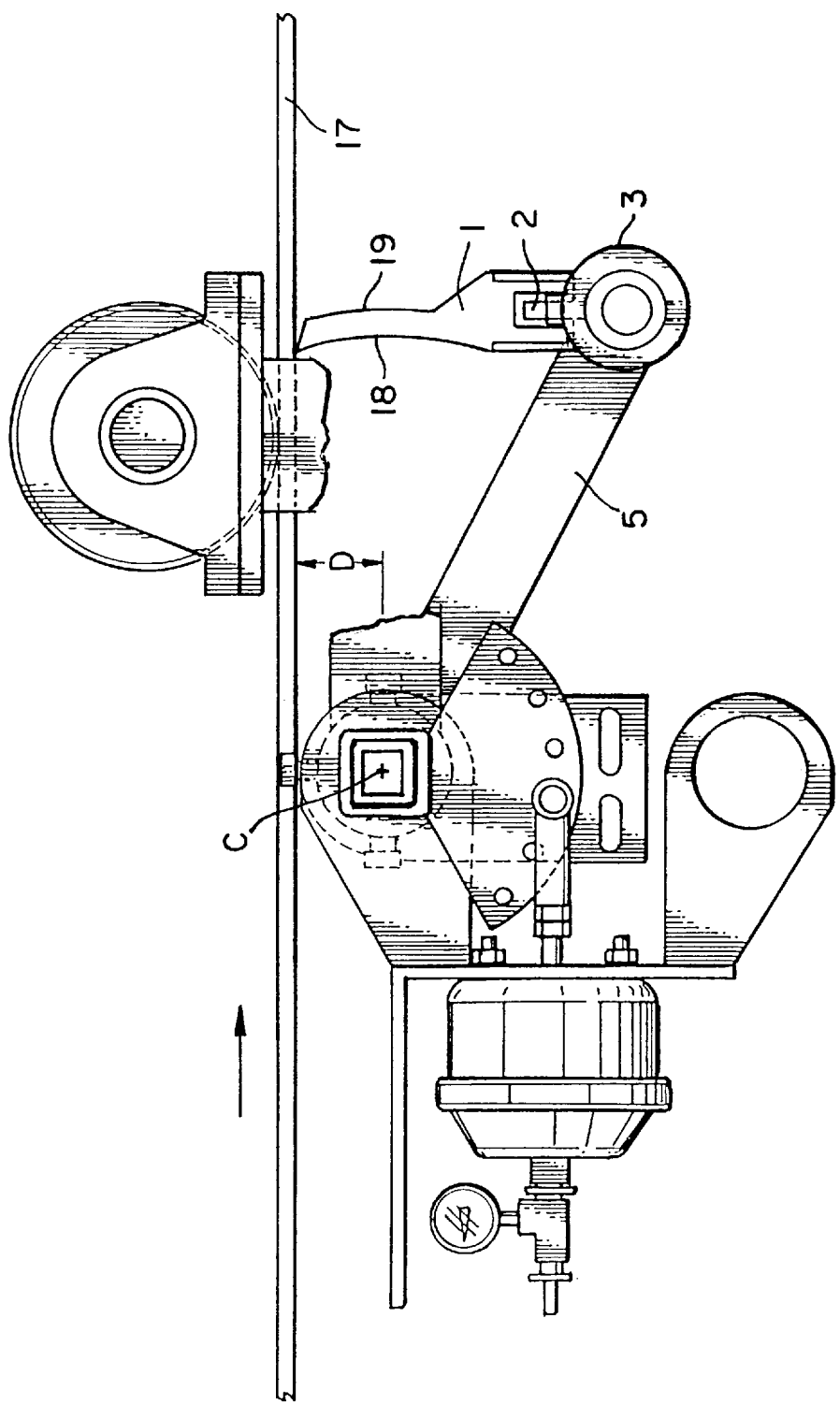
FIG. 2 is a side elevation of the belt cleaner.

FIGS. 2 and 4 illustrate the uniqueness of the present invention. FIG. 2 shows that the pivot point for the belt cleaner blade 1 is at the center C of the blade face 18 curvature arc back side 19 of the blade is formed from a second concentric arc using the same center point. FIG. 4 shows that the angle of attack A (shown as 77.2 degrees) between the belt 17 and the leading blade face 18 remains constant throughout the life of the cleaner which is important to consistent cleaning action, additionally the geometry of the blade and the mounting of the pivot point at the center of the blade arc provide for a constant blade contact area after the initial wear-in of the blade.

By changing distance "D" shown in FIG. 2 the angle of attack will change and the cross-sectional area will change, this feature is desirable to optimize the cleaning action of the cleaner to various materials with various properties of adherence to the conveyor belt.

Figure 3:
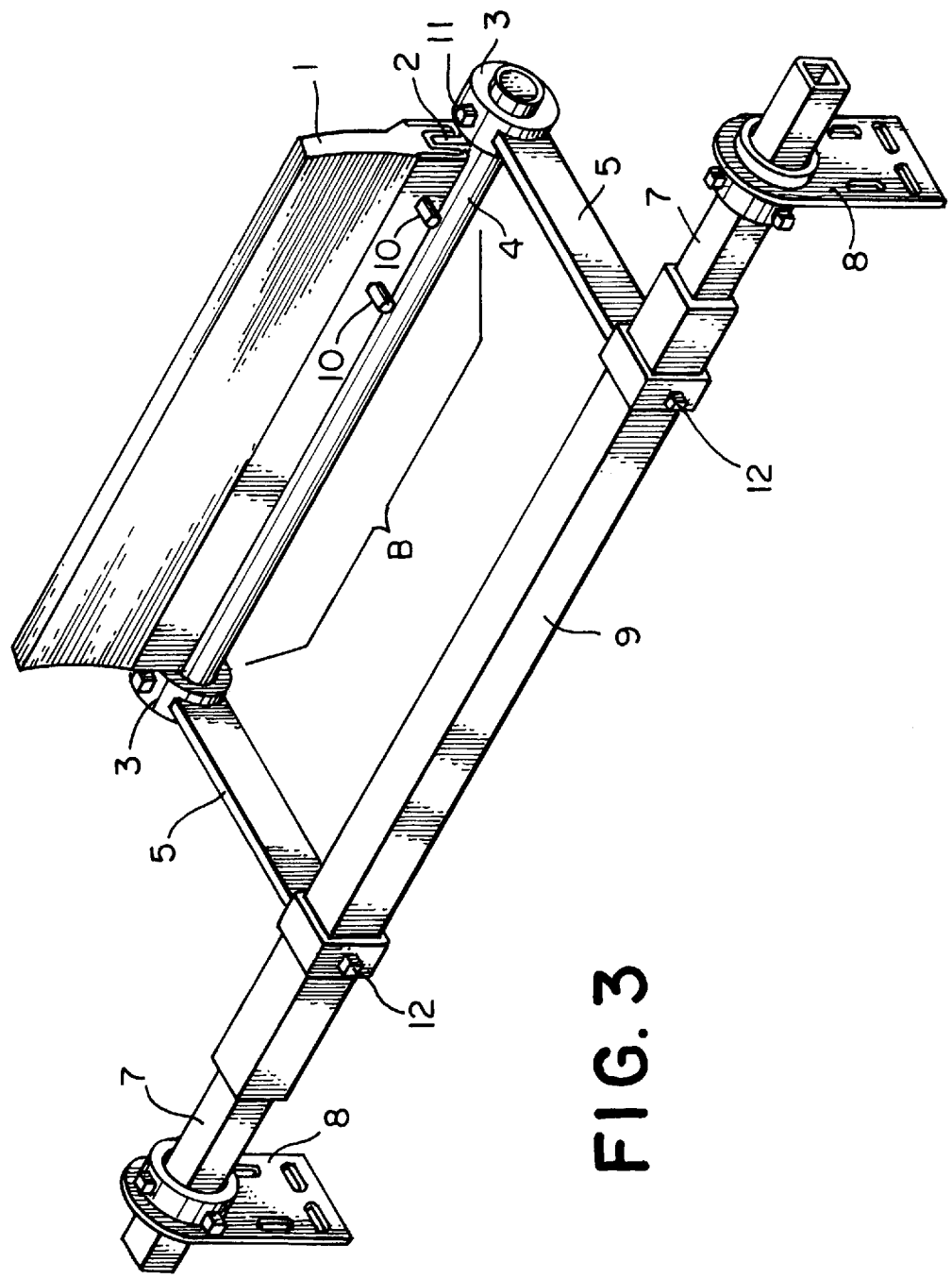
FIG. 3 is a perspective view showing a preferred embodiment of the present invention showing where build-up normally occurs.
Figure 4A:
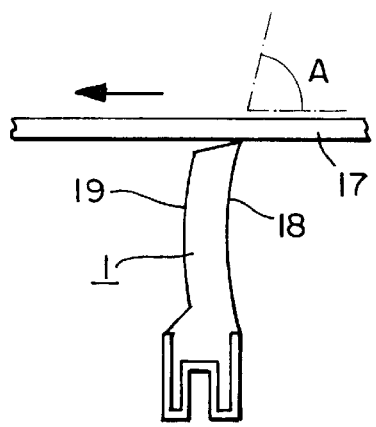
FIGS. 4A through 4D are a side elevations of the belt cleaner blade only showing the relationship of angle of attack, area of contact and blade wear.
Figure 4B:
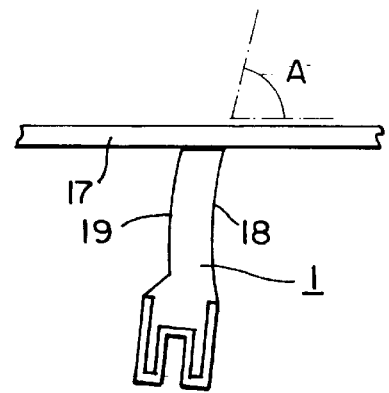
Figure 4C:
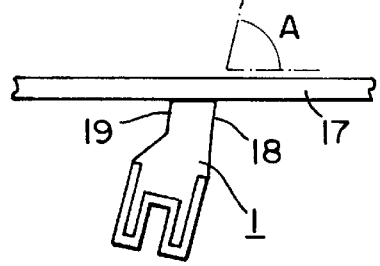
Figure 4D:
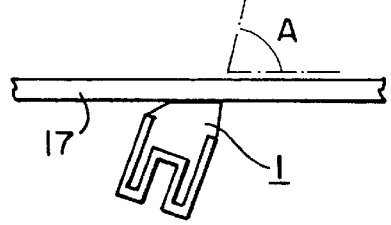
Figure 5:
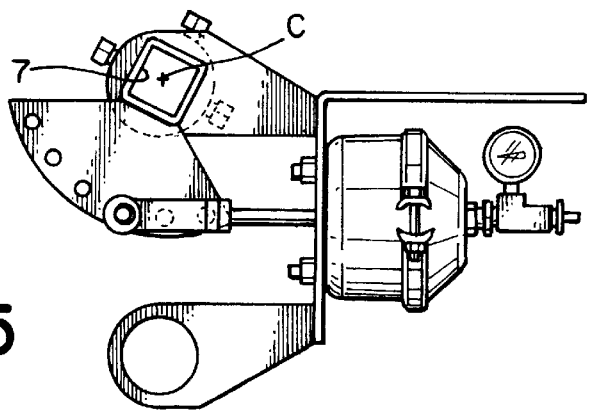
FIG. 5 is a side view of the diaphragm cylinder assembly for applying pressure in the fully extended position.
Figure 6:
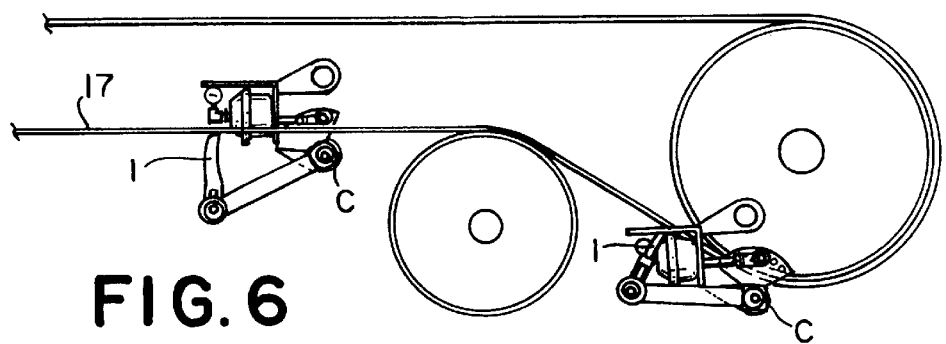
FIG. 6 is a side view showing the diaphragm cylinder assemblies mounted on the conveyor system.

FIG. 3 illustrates the location at B where build-up normally occurs when using belt cleaners that incorporate multiple blades and support elements.

I claim:

1. A pivotally actuated secondary belt cleaning device for cleaning the outer surface of a conveyor belt, comprising:

a blade support tube extending transverse to a conveyor belt with a rigid guide of predetermined cross-section on the support tube approximately the width of the belt;

a scraper blade whose length is approximately the width of the belt, mounted on the rigid guide on the support tube and engageable with the conveyor belt, the blade having a narrow base with a rigid element encapsulating the base of the resilient blade cleaning material, and a slot in the rigid +element interfitting with the rigid guide on the blade support tube;

said scraper blade having two curved sides formed from two concentric arcs with the same center point and a transition wall forming the top edge of the blade, the base of the blade being formed from encapsulating rigid metal;

said support tube having a cross-shaft mounted at the center of the arcs forming the sides of the blade, said shaft being attached to the blade support tube with two connecting arms of predetermined cross-section fixedly connecting the cross-shaft and the blade support tube.

2. A device as in claim 1 having the scraper blade removably mounted to the support tube by means of two fast pins, operable to be removed so that the blade can slide longitudinal to the support tube or lift perpendicular to the support tube for removal of the blade.

3. A secondary belt cleaning device as in claim 1, including a pressure roller provided to flatten and stabilize the belt, making the belt cleaning blade more effective.

4. A secondary belt cleaning device as in claim 1, which has connecting arms fixedly connecting the cross-shaft and the support tube external to the edges of the conveyor belt to prevent build-up.

5. A device as in claim 4, including collars on the ends of said connector arms, said scraper blade support tube operable to be rotated within the collars to permit removal of the blade from the support tube away from the belt.

6. A secondary belt cleaning device having a blade in which the blade side walls are formed by two concentric arcs, wherein the radial distance between the two arcs remains constant, and the upper end of the two arcs is terminated by a transition wall that extends from one arc to the other, said arcs having a common center of curvature, and a cross-shaft concentric with said arcs, a blade support pivoted on said cross-shaft, so as to maintain a constant angle of attack of the leading face of the blade with the conveyor belt as the blade is pivoted about the center of said cross-shaft.

7. A device as in claim 6, the concentric arcs of said blade having a length which will maintain a constant cross-sectional area of contact of the transitional wall with the conveyor belt, after initial wear in, as the blade is pivoted about the cross-shaft center.

8. A device as in claim 7 in which the angle of attack and cross-sectional area can be optimized, including means for moving the pivot point of the cross-shaft upward or downward from the mounting arrangement.

9. A secondary belt cleaning device for cleaning the outer surface of an endless conveyor belt of a given width operable to travel in a fixed path comprising:

an elongated blade support extending transversely to the path of travel of the conveyor belt and having an anchor plate extending along its length projecting toward the outer surface of the conveyor belt;

a pivotal shaft having at least one trailing arm projecting radially from said pivotal shaft and mounting said blade support for pivotal movement about the axis of said pivotal shaft, said pivotal shaft and said anchor plate being parallel to one another and parallel to the outer surface of the belt, said anchor plate being spaced from the pivotal shaft a given distance in the direction of travel of the belt in said path;

a scraper blade detachably mounted on said plate and extending from said blade support to the outer surface of the conveyor belt in said path, whereby pivotal movement of said shaft urges said blade toward and away from the outer surface of the belt; and means to apply a torsion bias to said shaft to bias said blade against said outer surface with a preselected force, said blade being arcuate in form having a concave forward surface centered on said pivotal shaft with a given radius of curvature and a convex rearward surface having a larger radius of curvature concentric with said given radius of curvature, the radial thickness of said arcuate blade being the difference between said respective radii of curvature, said radial thickness being uniform throughout a substantial length of said blade, said larger radius being approximately equal to said given distance;

said blade comprising a wear material having a tip at its distal end adapted to engage the outer surface of the belt and to be worn away during use of the device, the proximate end of said blade adapted to engage said plate and to be detachably supported thereby.

10. A device according to claim 9, wherein said blade is installed on said anchor plate with said centers of curvature concentric with said pivotal shaft, to provide a given attack angle between the surface of the belt and the tangent to the concave surface of the blade, said angle being maintained constant as the blade tip wears away to allow the anchor plate to pivotally move toward the outer surface of the belt.

11. A device according to claim 10, wherein the outer surface of the conveyor belt has a curvature transverse to the direction of travel of the belt, said tip at the distal end of the blade having a feather edge to facilitate the tip's being worn away so as to conform to the transverse curvature of the belt surface after installation of the blade on said plate.

12. A trailing arm scraper assembly for a conveyor belt normally traveling on one direction between a head pulley and a tail pulley mounted on a frame, the assembly including:

a scraper blade contacting the outwardly-directed surface of the belt along a transverse line spaced intermediate the head pulley and the tail pulley, said blade having a wear portion of uniform thickness adapted to bear against said belt at said line of contact and to be progressively worn down during operation of said conveyor belt;

a trailing arm supporting said blade at its forward end and pivotally mounted at its rearward end on a transverse axis spaced parallel to the said line of engagement at a given distance from said line of engagement in a direction opposite to said normal direction of travel of the belt;

torsion means between the pivoted end of said trailing arm and said frame exerting a torsional bias tending to pivot said arm in a direction to forcibly engage said scraper blade against the exposed outwardly-directed surface of said belt, said scraper blade comprising an arcuate member having a rearwardly-directed concave cylindrical surface having a radius of curvature equal to said given distance, the forwardly-facing surface of said arcuate blade defines a convex cylindrical surface with a constant radius of curvature of a length equal to said given distance plus a fixed increment, whereby the thickness of said blade in a direction radial to said pivotal axis is equal to said fixed increment throughout said wear portion, whereby upon wearing away of said wear portion the width of the area of contact between said blade and said belt is maintained substantially constant and the angle between said rearwardly-directed surface and said belt is likewise maintained substantially constant.

\* \* \* \* \*

UNITED STATES PATENT AND TRADEMARK OFFICE
CERTIFICATE OF CORRECTION

PATENT NO. : 5,887,702

DATED : March 30, 1999

INVENTOR : Mott, George T.

It is certified that errors appear in the above-identified patent and that said Letters Patent is hereby corrected as shown below:

Column 2, line 30, after "arc" insert --. The--;

line 30, after "blade" insert --1--;

line 32, "77.2" should be --77.32--.

Signed and Sealed this

Thirtieth Day of November, 1999

Attest:

Q. TODD DICKINSON

Attesting Officer

Acting Commissioner of Patents and Trademarks